(12) United States Patent
Voigt et al.

(10) Patent No.: US 10,540,402 B2
(45) Date of Patent: Jan. 21, 2020

(54) RE-EXECUTION OF AN ANALYTICAL PROCESS BASED ON LINEAGE METADATA

(71) Applicant: HEWLETT PACKARD ENTERPRISE DEVELOPMENT LP, Houston, TX (US)

(72) Inventors: Douglas L. Voigt, Boise, ID (US); Suparna Bhattacharya, Bangalore (IN); Neeraj Gokhale, Fremont, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 310 days.

(21) Appl. No.: 15/281,225

(22) Filed: Sep. 30, 2016

(65) Prior Publication Data

US 2018/0096079 A1    Apr. 5, 2018

(51) Int. Cl.
*G06F 17/30* (2006.01)
*G06F 16/907* (2019.01)
*G06F 16/14* (2019.01)

(52) U.S. Cl.
CPC ............ *G06F 16/907* (2019.01); *G06F 16/14* (2019.01)

(58) Field of Classification Search
CPC ......... G06F 17/30997; G06F 17/30604; G06F 17/30554; G06F 17/30368; G06F 17/30563; G06F 17/30103
See application file for complete search history.

(56) References Cited

U.S. PATENT DOCUMENTS

| | | | |
|---|---|---|---|
| 6,609,123 B1 | 8/2003 | Cazemier et al. | |
| 7,185,016 B1 * | 2/2007 | Rasmussen | G06Q 10/10 |
| 7,373,350 B1 | 5/2008 | Arone et al. | |
| 7,734,619 B2 | 6/2010 | Vierich et al. | |
| 7,814,142 B2 * | 10/2010 | Mamou | G06F 16/254 |
| | | | 709/203 |

(Continued)

FOREIGN PATENT DOCUMENTS

| | | |
|---|---|---|
| WO | WO-2016048344 | 3/2016 |
| WO | WO-2016048345 | 3/2016 |
| WO | WO-2016049835 | 4/2016 |

OTHER PUBLICATIONS

Li, H. et al., "Tachyon: Reliable, Memory Speed Storage for Cluster Computing Frameworks," (Research Paper), Proceedings of the ACM Symposium on Cloud Computing, 2014, 15 pages, available at https://people.eecs.berkeley.edu/~haoyuan/papers/2014_socc_tachyon.pdf.

(Continued)

*Primary Examiner* — Daniel A Kuddus
(74) *Attorney, Agent, or Firm* — Hewlett Packard Enterprise Patent Department

(57) ABSTRACT

Examples disclosed herein relate to re-execution of an analytical process based on lineage metadata. In an example, a determination may be made on a hub device that an analytical process previously executed on a remote edge device is to be re-executed on the hub device, wherein the analytical process is part of an analytical workflow that is implemented at least in part on the hub device and the remote edge device. In response to the determination, a storage location of input data for re-executing the analytical process may be identified based on lineage metadata stored on the hub device, and input data may be acquired from the storage location.

15 Claims, 14 Drawing Sheets

(56) References Cited

U.S. PATENT DOCUMENTS

| | | | |
|---|---|---|---|
| 8,316,299 | B2 | 11/2012 | Asaka et al. |
| 9,058,633 | B2 | 6/2015 | Lindores et al. |
| 9,710,614 | B2 | 7/2017 | Ruzic et al. |
| 9,767,100 | B2 | 9/2017 | Bator et al. |
| 9,811,573 | B1* | 11/2017 | Xiang .................... G06F 16/26 |
| 9,954,953 | B2 | 4/2018 | Baughman et al. |
| 2005/0223109 | A1* | 10/2005 | Mamou ................. G06Q 10/10 709/232 |
| 2006/0271505 | A1* | 11/2006 | Vierich ................. G06F 16/283 |
| 2009/0018996 | A1* | 1/2009 | Hunt ...................... G06Q 30/02 |
| 2011/0320460 | A1* | 12/2011 | Fankhauser ........... G06Q 10/10 707/748 |
| 2012/0310875 | A1* | 12/2012 | Prahlad ............... G06F 16/2465 707/602 |
| 2013/0304903 | A1 | 11/2013 | Mick et al. |
| 2013/0332423 | A1 | 12/2013 | Puri et al. |
| 2014/0002895 | A1* | 1/2014 | Nakajima ............. G02B 5/282 359/359 |
| 2014/0067758 | A1 | 3/2014 | Boldyrev et al. |
| 2014/0088922 | A1* | 3/2014 | Messenger ......... A63B 24/0062 702/189 |
| 2014/0223430 | A1 | 8/2014 | Stuempfle et al. |
| 2015/0331635 | A1 | 11/2015 | Ben-Shaul et al. |
| 2015/0347542 | A1* | 12/2015 | Sullivan ............... G06F 16/254 707/602 |
| 2016/0253340 | A1* | 9/2016 | Barth .................... G06F 16/122 707/756 |
| 2016/0306827 | A1* | 10/2016 | Dos Santos ............. G06F 16/25 |
| 2016/0314143 | A1* | 10/2016 | Hiroshige ............. G06F 16/254 |
| 2017/0060574 | A1 | 3/2017 | Malladi et al. |
| 2017/0339225 | A1 | 11/2017 | Vasetsky et al. |
| 2018/0069933 | A1 | 3/2018 | Chandra et al. |
| 2018/0096079 | A1 | 4/2018 | Voigt et al. |

OTHER PUBLICATIONS

Zaharia, M. et al., "Resilient Distributed Datasets: A Fault-Tolerant Abstraction for In-Memory Cluster Computing," Proceedings of the 9th USENIX Conference on Networked Systems Design and Implementation, USENIX Association, 2012, 14 pages, available at http://www-bcf.usc.edu/~minlanyu/teach/csci599-fall12/papers/nsdi_spark.pdf.

Mass et al., "WiseWare: A Device-to-Device-based Business Process Management System for Industrial Internet of Things", 2016 IEEE International Conference on Internet of Things (iThings) and IEEE Green Computing and Communications (GreenCom) and IEEE Cyber, Physical and Social Computing (CPSCom) and IEEE Smart Data (SmartData), 2016.

Yu et al., "Toward Cloud-based Vehicular Networks with Efficient Resource Management", IEEE Network, vol. 27, Issue 5, Aug. 28, 2013, pp. 1-9.

\* cited by examiner

DETERMINE, WITH AN EDGE DEVICE AND BASED ON LINEAGE METADATA STORED ON THE EDGE DEVICE, A VALUE OF A PARAMETER RELATED TO A NUMBER OF HISTORICAL ATTEMPTS AT EXECUTION OF AN ANALYTICAL PROCESS ON A REMOTE HUB DEVICE, WHEREIN THE ANALYTICAL PROCESS IS PART OF AN ANALYTICAL WORKFLOW THAT IS IMPLEMENTED AT LEAST IN PART ON THE EDGE DEVICE AND THE REMOTE HUB DEVICE, AND WHEREIN THE LINEAGE METADATA COMPRISES DATA ASSOCIATED WITH INPUT DATA PROVIDED TO THE ANALYTICAL PROCESS, DATA ASSOCIATED WITH OUTPUT DATA GENERATED BY THE ANALYTICAL PROCESS, AND DATA IDENTIFYING THE ANALYTICAL PROCESS USED TO PROCESS THE INPUT DATA TO GENERATE THE OUTPUT DATA — 802

IN RESPONSE TO A DETERMINATION THAT THE VALUE OF THE PARAMETER RELATED TO THE NUMBER OF HISTORICAL ATTEMPTS AT EXECUTION OF THE ANALYTICAL PROCESS ON THE REMOTE HUB DEVICE IS ABOVE A PREDEFINED THRESHOLD, PROVIDE BY THE EDGE DEVICE TO THE REMOTE HUB DEVICE, INPUT DATA FOR A FUTURE EXECUTION OF THE ANALYTICAL PROCESS IN ADVANCE OF PERFORMANCE OF THE FUTURE EXECUTION OF THE ANALYTICAL PROCESS ON THE REMOTE HUB DEVICE WITHOUT A REQUEST FOR THE INPUT DATA BY THE REMOTE HUB DATA — 804

RE-EXECUTION OF AN ANALYTICAL PROCESS BASED ON LINEAGE METADATA

BACKGROUND

Data may originate from various sources. These sources may include various types of systems, devices and applications. The data generated by various sources may range from a few kilobytes to multiple petabytes. Further, the generated data may be in structured, semi-structured, or unstructured form.

BRIEF DESCRIPTION OF THE DRAWINGS

For a better understanding of the solution, examples will now be described, purely by way of example, with reference to the accompanying drawings, in which:

FIG. 8 is a flowchart of an example method for provisioning data for an analytical process based on lineage metadata;

DETAILED DESCRIPTION

Figure 1:
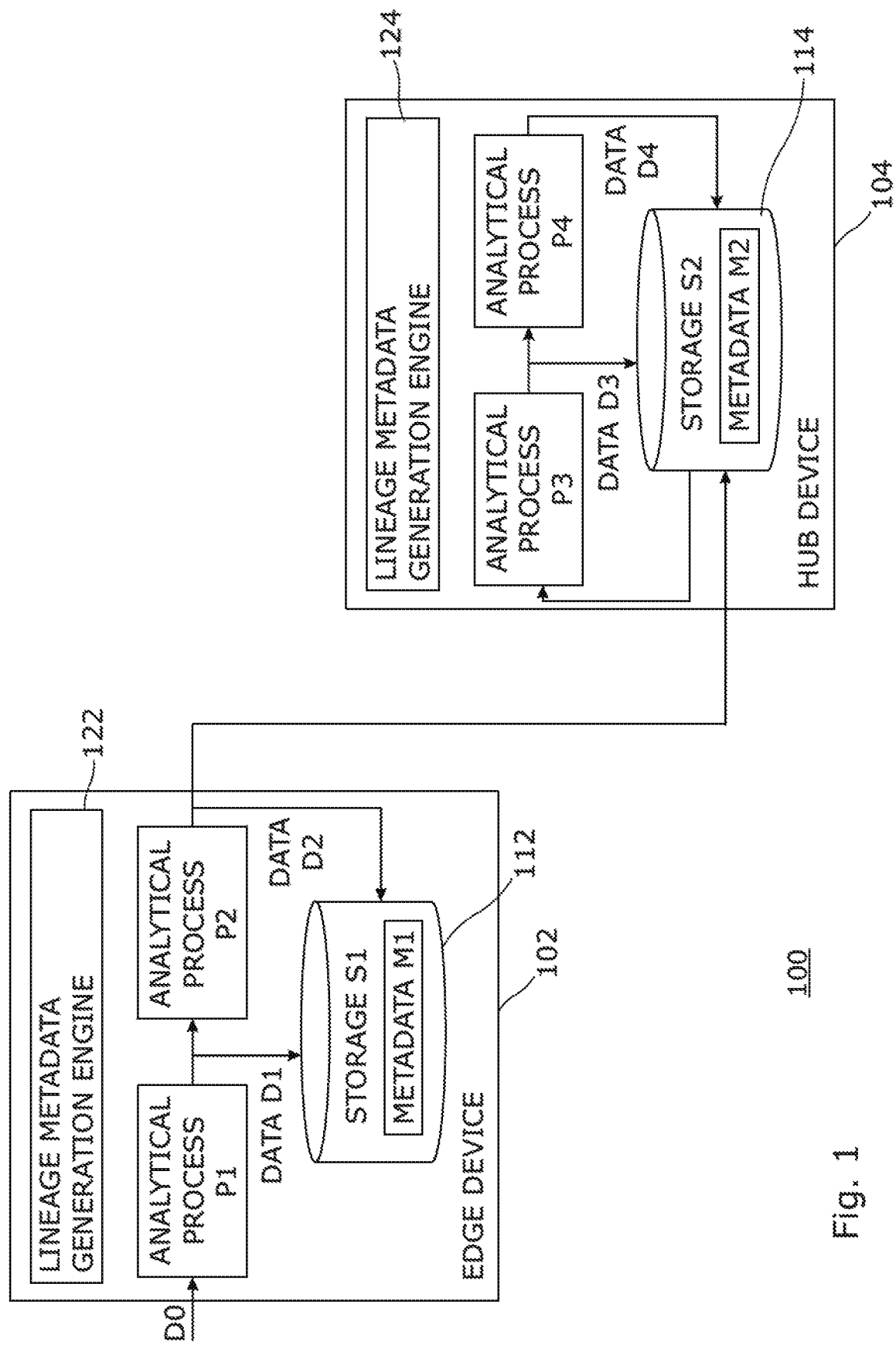
FIG. 1 is a block diagram of an example computing environment to execute an analytical process based on lineage metadata.

Data may originate from various sources (for example, systems, devices and applications). There may be scenarios where data sources may be geographically distributed. For example, in an Internet of Things (IoT) context. As used herein, the Internet of Things (IoT) may refer to a network of devices that may be provided with unique identifiers and network connectivity that allow them to exchange data over a network. A device in an IoT network may be embedded with a sensor(s) for collecting data that may be shared with other devices. For example, video cameras installed at multiple locations in an office complex or a gated community may capture and record video data.

Data captured by a source may be processed locally on the data source, or data may be transferred to another device for processing. In some scenarios, data be processed as a part of an analytical workflow both on the source device and the destination device. In the context of the "video cameras" example mentioned earlier, data captured by various video cameras (may be referred to as "edge devices" in an IoT context) may undergo some basic processing operations on the respective source devices before the data is transferred to a central device (may be referred to as "hub device") for further processing (for example, facial recognition analysis). The various analytical processes involved in processing the video data may be executed as part of a workflow.

There may be scenarios where it may not be feasible to continuously transmit data from data sources to a central location quickly enough to meet, for example, a Service Level Agreement (SLA), a time period, or a budget-related goal of an analytical solution. Further, a distributed workflow may be regarded as inefficient if an analytical process that is typically executed at an edge device may be re-executed on the same data in a central location (for example, a hub device), and/or if an analytical process is repeatedly performed in a location that may be far from the current location of the data. Needless to say, these are not desirable scenarios.

To address these challenges, the present disclosure describes various examples for performing an action related to an analytical process based on lineage metadata. In an example, a determination may be made on a hub device that an analytical process previously executed on a remote edge device is to be re-executed on the hub device. The analytical process may be part of an analytical workflow that is implemented at least in part on the hub device and the remote edge device. In response to the determination, a storage location of input data for re-executing the analytical process may be identified based on lineage metadata stored on the hub device. The lineage metadata may comprise at least one of data associated with input data provided to an analytical process, data associated with output data generated by the analytical process, and data identifying the analytical process used to process the input data to generate the output data. In response to the identification, the hub device may acquire the input data from the storage location.

FIG. 1 is a block diagram of an example computing environment 100 to execute an analytical process based on lineage metadata. In an example, computing environment 100 may include an edge device 102 and a hub device 104. Although one edge device is shown in FIG. 1, other examples of this disclosure may include more than one edge device. In an example, in an IoT network, edge device 102 and hub device 104 may be referred to as "IoT devices".

Edge device 102 and hub device 104 may each represent a computing device, a storage device, a network device, and/or any combination thereof. In an example, edge device 102 and hub device 104 may each represent any type of system capable of executing machine-readable instructions. For example, edge device 102 and hub device 104 may each represent an embedded computing device that transmits and receives information over a network. Some examples of edge device 102 and hub device 104 may include a desktop computer, a notebook computer, a tablet computer, a thin client, a mobile device, a personal digital assistant (PDA), a server, a printer, a network device, a storage device, a disk array, an automobile, a clock, a lock, a refrigerator, an enterprise security system, and a coffee maker. In an example, edge device 102 may include an embedded system or a small to medium size server. In an example, hub device 104 may include a medium to large server, a server cluster or a storage cluster.

In an example, edge device 102 and hub device 104 may each include one or more sensors. The sensor(s) may be used to detect events or changes in the environment of the host device (for example, 102 and 104), and then provide a corresponding output. The sensor(s) may provide various types of output, for example, an electrical signal or an optical signal. In an example, the output may be stored as data on the corresponding computing device. Some examples of the sensor that may be present or embedded on edge device 102 and hub device 104 may include a pressure sensor, a motion sensor, a light sensor, an infra-red sensor, a humidity sensor, a gas sensor, an acceleration sensor, a color sensor, and a gyro sensor.

Edge device 102 and hub device 104 may be communicatively coupled, for example, via a network. In an example, the network may be an IoT network. The network may be a wireless (for example, a cellular network) or a wired network. The network may include, for example, a Local Area Network (LAN), a Wireless Local Area Network (WAN), a Metropolitan Area Network (MAN), a Storage Area Network (SAN), a Campus Area Network (CAN), or the like. Further, the network may be a public network (for example, the Internet) or a private network (for example, an intranet). Edge device 102 and hub device 104 may use wired and/or wireless technologies for communication. Examples of wireless technologies may include Radio-frequency identification (RFID), Near-field Communication (NFC), optical tags, Bluetooth low energy (BLE), ZigBee, Thread, LTE-Advanced, and WIFI-Direct.

Edge device 102 and hub device 104 may be located at different sites in the computing environment 100. For example, edge device 102 may be located at a first site, and hub device 104 may be located at a second site. The first site and the second site may represent two different geographical locations. For example, the first site and the second site may be two different countries, states, towns, or buildings.

In an example, edge device 102 and hub device 104 may each be assigned a unique identifier. A unique identifier may be used to identify an associated device (for example, 102). In an example, the unique identifier may include a MAC (media access) address.

In an example, edge device 102 and hub device 104 may each execute at least one analytical process of an analytical workflow. As used herein, an analytical workflow may refer to a set of operations to process data. In an example, edge device 102 may be a data source for source data D0. For example, a video camera may act as a data source for video data. The source data may include structured data (for example, relational data), semi-structured data (for example, XML data), and unstructured data (for example, word processor data). The source data may include stored data or real time data (for example, social networking feeds). Further, the source data may include raw data (i.e. unprocessed data) or processed data. In another example, another device (not shown in FIG. 1) may act as a data source, and provide source data to edge device 102. In an example, source data (D0) may be stored in a storage repository S1 (112) of edge device 102.

Referring to FIG. 1, in an example, analytical processes P1 and P2 of an analytical workflow may be executed on edge device 102, and analytical processes P3 and P4 of the same workflow may be executed on hub device 104. It may be noted that although edge device 102 and hub device 104 are shown to execute two analytical processes each in FIG. 1, in other examples edge device 102 and hub device 104 may each execute less or more than two analytical processes of a workflow. Some examples of the analytical process (for example, P1, P2, P3, and P4) may include topic extraction, impact analysis, log analytical, sentiment analytical, trend analytical, moving average, influence maximization, and feature extraction. The analytical process (for example, P1, P2, P3, and P4) may be used, for example, to analyze data, discover patterns in data, and/or propose new analytical models to recognize identified patterns in data.

In an example, source data D0 may first be processed by analytical process P1 on edge device 102. Some examples of processing that the data D0 may undergo or subjected to may include transformation (for example, as part of an Extract, Transform, and Load (ETL) process), formatting, conversion, mapping, classification, analysis, summarization, and clustering.

In response to processing of source data D0 by analytical process P1, output data D1 may be stored in a storage repository S1 on edge device 102. Since analytical process P2 is a part of the same workflow that includes analytical process P1, in an example, output data D1 may be used as input data by analytical process P2 to generate output data D2. In an example, data D1 may undergo or be subjected to processing similar to the processing described above for data D0. The output data D2 may be stored in the storage repository S1.

Edge device 102 and hub device 104 may each include a lineage metadata generation engine 122 and 124, respectively. Lineage metadata generation engine 122 in edge device 102 may generate metadata M1 related to processing of input data D0 and D1 by analytical processes P1 and P2, respectively. In an example, metadata generated by lineage metadata generation engine may include lineage metadata. As defined herein, lineage metadata may comprise at least one of data associated with input data provided to an analytical process, data associated with output data generated by the analytical process, and data identifying the analytical process used to process the input data to generate the output data. In the present example, lineage metadata M1 may be generated in response to processing of input data D0 and D1 by analytical processes P1 and P2, respectively, of the analytical workflow.

Some examples of lineage metadata M1 generated by lineage metadata generation engine 122 may include data identifying the analytical process used to process input data, the type of input data (for example, text, graph, etc.), the source of data (for example, an IoT device, a social networking site, etc.), the time of generation of an output data, an Application Programming Interface (API) used for accessing output data, input data, storage location of input data, output data, and storage location of output data.

Lineage metadata M1 may be stored in the storage repository S1 on edge device 102. In an example, lineage metadata generation engine 122 may send a copy of lineage metadata M1 to hub device 104. In response, hub device 104 may store the received metadata in a storage repository S2 (114). Thus, both edge device 102 and hub device 104 may store lineage metadata M1.

Figure 2:
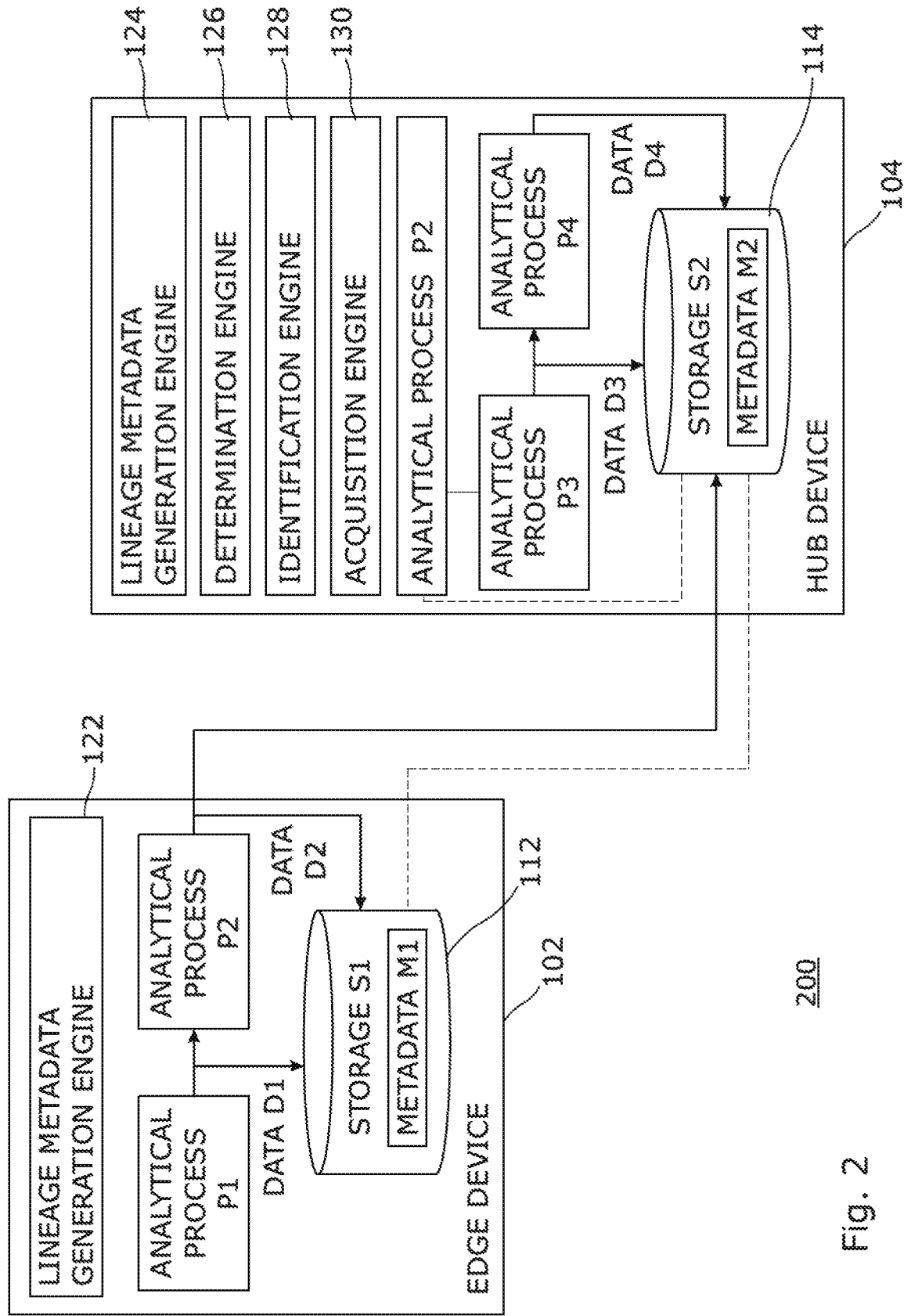
FIG. 2 is a block diagram of an example computing environment to re-execute an analytical process based on lineage metadata.

As mentioned earlier, analytical processes P3 and P4 of the workflow may be executed on hub device 104. Referring to FIG. 2, identification engine 128 on hub device 104 may identify input data for the analytical process P3. In an example, identification engine 128 may identify the input data based on lineage metadata M1 stored in the storage repository S2 on hub device 104. In an example, data D2 may be used an input data for the analytical process P3. Identification engine 128 may identify data D2 as input data for the analytical process P3 from lineage metadata M1 in the storage repository S2.

In response to the identification of input data D2 for the analytical process P3, identification engine 128 may determine the location of the input data D2 from lineage metadata M1 in the storage repository S2. In an example, identification engine 128 may determine the location of input data D2 (for example, edge device 102) from storage location of input data D2 included in metadata M1. In response to the determination, hub device 104 may acquire data D2 from edge device 102.

Referring to FIG. 2, in an example, an analytical process (for example, P2) associated with edge device 102 may be identified for re-execution on hub device 104. The re-execution of the analytical process P2 on hub device 104 may involve using same data that was earlier used during execution of the process P2 on edge device 102. In an example, the re-execution of the analytical process P2 on hub device 104 may be occasioned due to a change in a parameter(s) related to the analytical process P2. In response to a determination by identification engine 128 on hub device 104 that the analytical process P2 is to be re-executed, identification engine 128 may identify input data (for example, D1) for the analytical process P2. In an example, identification engine 128 may identify the input data D1 from metadata M1 stored in the storage repository S2 on hub device 104.

In response to the identification of the input data D1 for re-executing the analytical process P2, identification engine 128 may determine a location of the input data D1 from lineage metadata M1 in the storage repository S2. In an example, the location of the input data D1 may be edge device 102. In another example, the location of the input data D1 may be another device (for example, another edge device) in computing environment 100. In response to the determination, hub device 104 may acquire data D1 from its current storage location (for example, edge device 102) identified from lineage metadata M1. The acquired data D1 may be used for re-executing the analytical process P2 on hub device 104.

The analytical process P3 may process data D2 to generate output data D3. In an example, data D2 may undergo or be subjected to processing similar to the processing described above for data D0. The output data D3 may be stored in the storage repository S2 on hub device 104. Since analytical process P4 is a part of the same workflow that includes analytical process P3, in an example, output data D3 may be used as input data by analytical process P3 to generate output data D4. In an example, data D3 may undergo or be subjected to processing similar to the processing described above for data D0. The output data D4 may be stored in the storage repository S2.

As mentioned earlier, hub device 104 may include a lineage metadata generation engine 124. Metadata generation engine 124 in hub device 104 may generate metadata M2 during and/or after processing of input data D2 and D3 by analytical processes P3 and P4, respectively. In an example, metadata generated by metadata generation engine 124 may include lineage metadata. Lineage metadata M2 may include metadata similar to the examples described earlier for metadata M1. Some examples of lineage metadata M2 generated by lineage metadata generation engine 124 may include data identifying the analytical process used to process input data, the type of input data (for example, text, graph, etc.), the source of data (for example, an IoT device, a social networking site, etc.), the time of generation of an output data, an Application Programming Interface (API) used for accessing output data, input data, storage location of input data, output data, and storage location of output data.

Lineage metadata M2 may be stored in the storage repository S2 on hub device 104. In an example, metadata generation engine 124 may send a copy of metadata M2 to edge device 102. In response, edge device 102 may store lineage metadata M2 in the storage repository S1. Thus, both edge device 102 and hub device 104 may store lineage metadata M1 and M2.

Figure 3:
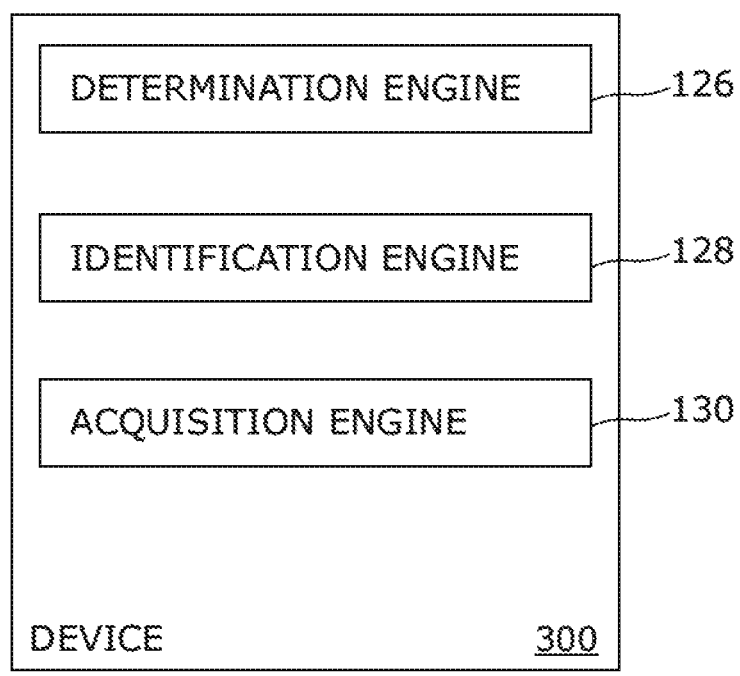
FIG. 3 is a block diagram of an example device to re-execute an analytical process based on lineage metadata.

FIG. 3 is a block diagram of an example device 300 to re-execute an analytical process based on lineage metadata. In an example, device 300 may be implemented by any suitable device, as described herein in relation to device 104 of FIG. 1, for example.

Device 300 may include a determination engine 126, an identification engine 128 and an acquisition engine 130, as described above in relation to FIGS. 1 and 2.

In an example, determination engine 126 may determine that an analytical process previously executed on a remote edge device (for example, 102) is to be re-executed on the device 300. In an example, the determination may comprise at least one of: a re-execution component and a determination component. A re-execution component may represent a request received from a remote edge device (for example, 102) to re-execute an analytical process that may have been previously executed on the remote edge device. The determination component may represent an analysis of whether the re-execution request can be completed on the device 300. The analytical process may part of an analytical workflow that is implemented at least in part on the device 300 and the remote edge device. In response to the determination, identification engine 128 may identify based on lineage metadata stored on the device 300, a storage location of input data to re-execute the analytical process. The lineage metadata may comprise data associated with input data provided to an analytical process, data associated with output data generated by the analytical process, and data identifying the analytical process used to process the input data to generate the output data. Acquisition engine 130 may acquire the input data from the identified storage location.

Referring to FIGS. 1 to 3, engines 122, 124, 126, 128, 130, 132, 134, 152, and 154 may be any combination of hardware and programming to implement the functionalities of the engines described herein. In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of devices 102 and 104. In some examples, the at least one machine-readable storage medium may store instructions that, when executed by the at least one processing resource, at least partially implement some or all engines of the device 102 or 104. In such examples, devices 102 and 104 may each include the at least one machine-readable storage medium storing the instructions and the at least one processing resource to execute the instructions.

Figure 4:
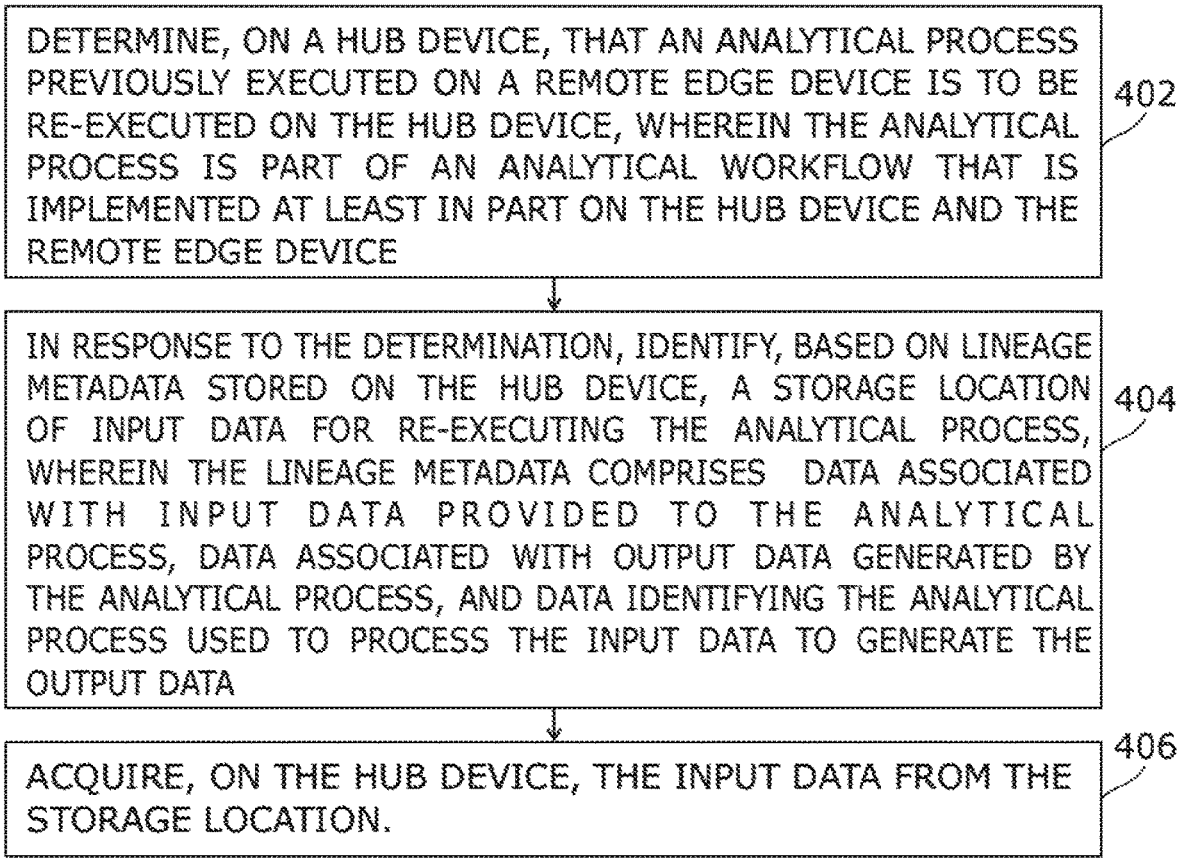
FIG. 4 is a flowchart of an example method for re-executing an analytical process based on lineage metadata.

FIG. 4 is a flowchart of an example method 400 for re-executing an analytical process based on lineage metadata. The method 400, which is described below, may at least partially be executed on a device, for example, device 102 and 104 of FIGS. 1 and 2. However, other devices may be used as well. At block 402, a determination may be made on a hub device (for example, 104) that an analytical process previously executed on a remote edge device (for example, 102) is to be re-executed on the hub device. The analytical process may be part of an analytical workflow that is implemented at least in part on the hub device and the remote edge device. At block 404, in response to the determination, a storage location of input data for re-executing the analytical process may be identified based on lineage metadata stored on the hub device. The lineage metadata may comprise at least one of data associated with input data provided to an analytical process, data associated with output data generated by the analytical process, and data identifying the analytical process used to process the input data to generate the output data. In an example, the lineage metadata may include lineage metadata of the analytical workflow. At block 406, the hub device may acquire the input data from the storage location.

Figure 5:
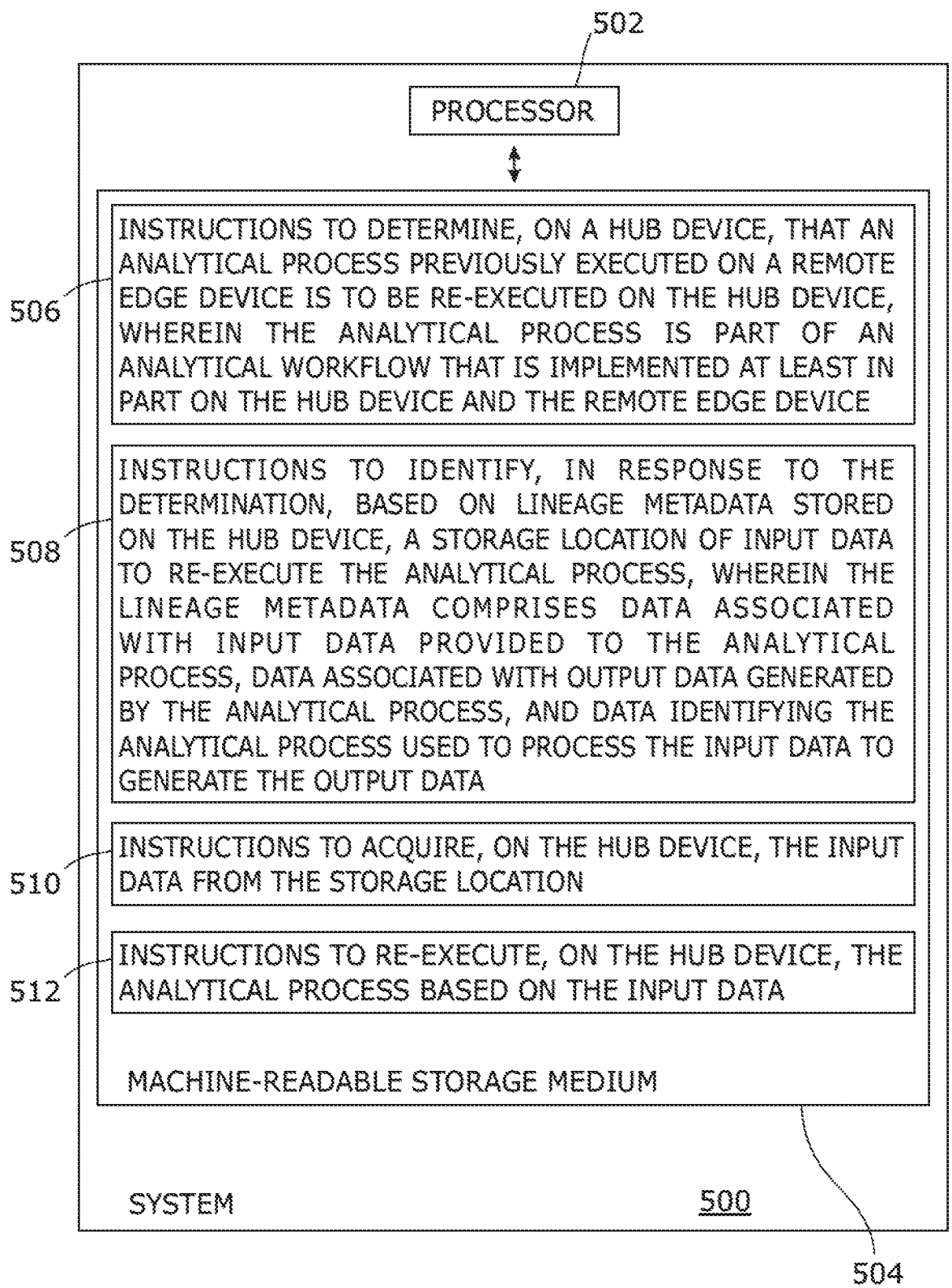
FIG. 5 is a block diagram of an example system including instructions in a machine-readable storage medium to re-execute an analytical process based on lineage metadata.

FIG. 5 is a block diagram of an example system 500 including instructions in a machine-readable storage medium to re-execute an analytical process based on lineage metadata. System 500 includes a processor 502 and a machine-readable storage medium 504 communicatively coupled to the processor (e.g., through a system bus). In an example, system 500 may be analogous to device 102 or 104 of FIG. 1 or 2. Processor 502 may be any type of Central Processing Unit (CPU), microprocessor, or processing logic that interprets and executes machine-readable instructions stored in machine-readable storage medium 504. Machine-readable storage medium 504 may be a random access memory (RAM) or another type of dynamic storage device that may store information and machine-readable instructions that may be executed by processor 502. For example, machine-readable storage medium 504 may be Synchronous DRAM (SDRAM), Double Data Rate (DDR), Rambus DRAM (RDRAM), Rambus RAM, etc. or a storage memory media such as a floppy disk, a hard disk, a CD-ROM, a DVD, a pen drive, and the like. In an example, machine-readable storage medium 504 may be a non-transitory machine-readable medium. Machine-readable storage medium 504 may store instructions 506, 508, 510, and 512. In an example, instructions 506 may be executed by processor 502 to determine, on a hub device, that an analytical process previously executed on a remote edge device is to be re-executed on the hub device, wherein the analytical process may be part of an analytical workflow that is implemented at least in part on the hub device and the remote edge device. Instructions 508 may be executed by processor 502 to, in response to the determination, identify based on lineage metadata stored on the hub device, a storage location of input data to re-execute the analytical process, wherein the lineage metadata may comprise at least one of data associated with input data provided to an analytical process, data associated with output data generated by the analytical process, and data identifying the analytical process used to process the input data to generate the output data. Instructions 510 may be executed by processor 502 to acquire, on the hub device, the input data from the storage location. In an example, instructions 512 may be executed by processor 502 to re-execute, on the hub device, the analytical process based on the input data.

Figure 6:
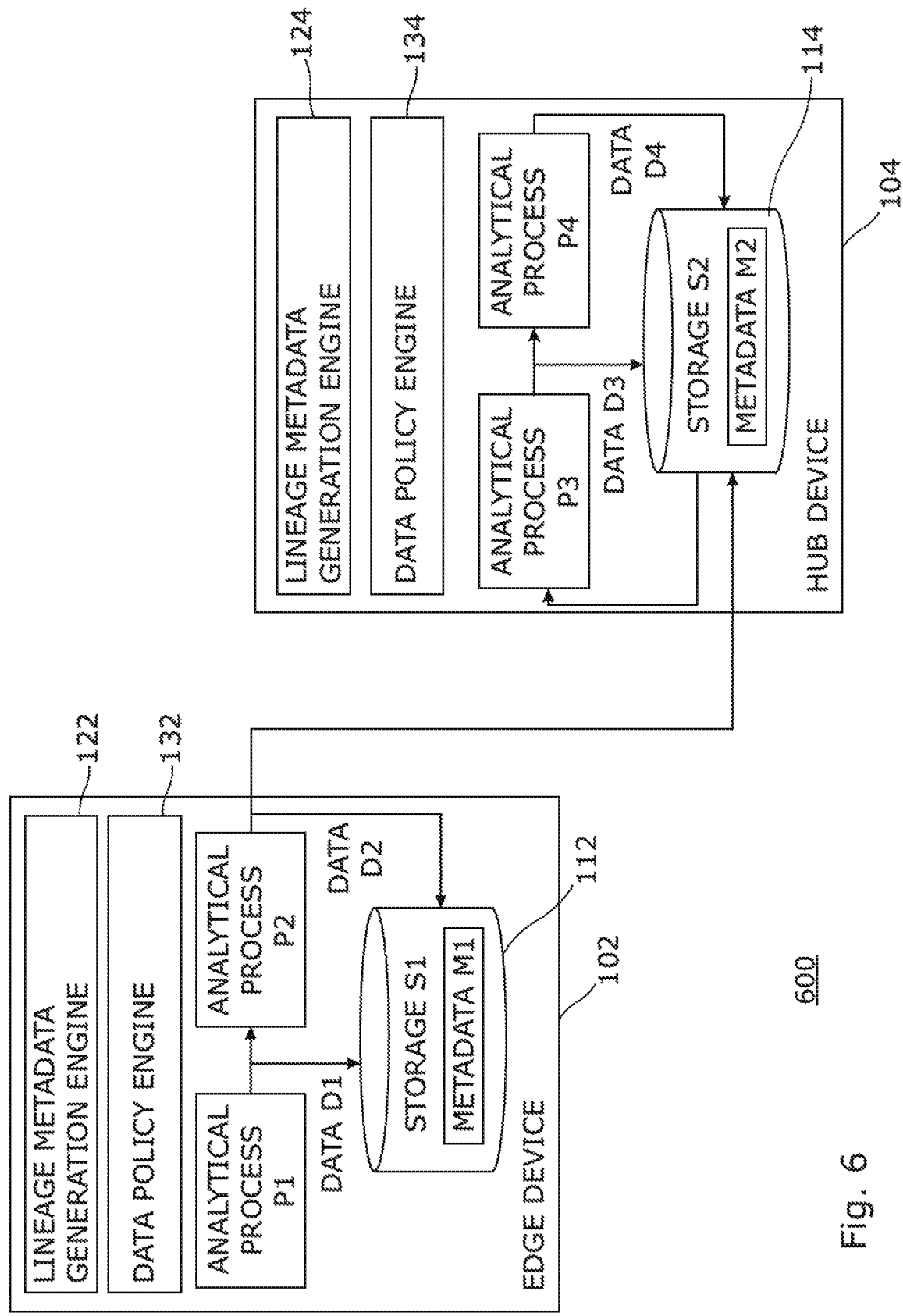
FIG. 6 is a block diagram of an example computing environment to provision data for an analytical process based on lineage metadata.

FIG. 6 is a block diagram of an example computing environment 600 to provision data for an analytical process based on lineage metadata. In an example, edge device 102 and hub device 104 may each include a data policy engine 132 and 134, respectively. Data policy engine 132 on edge device 102 may determine a parameter related to an analytical process (for example, P3) on hub device 104. In an example, the parameter may include a re-execution count of an analytical process (for example, P3) on hub device 104. As used herein, the re-execution count of an analytical process may refer to a number of times the analytical process is re-executed. In response to a determination by data policy engine 132 that the re-execution count of an analytical process (for example, P3) on hub device 104 is above a predefined threshold, data policy engine 134 on edge device 102 may provide input data (for example, D2) for the analytical process P3 to hub device 104 in advance of execution of the analytical process P3 on hub device 104. In other words, input data (for example, D2) for executing an analytical process (for example, P3) may be pushed in advance to the location where the re-execution is to occur (for example, hub device 104) if the re-execution count of the analytical process (for example, P3) on that location (for example, hub device 104) exceeds a pre-defined threshold.

In an example, the parameter may include a number of times an analytical process (for example, P3) failed to be executed on hub device 104 due to unavailability of input data (for example, D2) from edge device 102. In an example, the unavailability of input data (for example, D2) from edge device 102 may be due to a failure in a communication link between edge device 102 and hub device 104. Data policy engine 132 of edge device 102 may determine a number of times that a request, from a remote hub device 104, for data for executing an analytical process (for example, P3) on remote hub device 104 is unfulfilled by edge device 102 due to unavailability of input data from edge device 102. In response to a determination that the number of times the request for data is unfulfilled due to unavailability of input data from edge device 102 exceeds a pre-defined threshold, data policy engine 132 on edge device 102 may provide input data (for example, D2) for the analytical process P3 to hub device 104 in advance of execution of the analytical process P3 on hub device 104.

In an example, input data (for example, D2) for an analytical process (for example, P3) that is provided by edge device 102 to hub device in advance of execution of the analytical process P3 on hub device 104 may include new data that may be generated on or received by edge device 102 from a data source. The new data may relate to the workflow that includes the analytical process P3. For example, if edge device 102 includes a video camera, new data may include new images recorded by edge device 102. In another example, input data (for example, D2) for an analytical process (for example, P3) that is provided by edge device 102 to hub device in advance of execution of the analytical process P3 on hub device 104 may include data repeatedly requested by hub device 104 from edge device 102.

In an example, data policy engine 132 on edge device 102 may determine whether to provide new data for an analytical process (for example, P3) to hub device in advance of execution of the analytical process P3 on hub device 102 based on at least one of: a ranking of new datasets in the new data; bandwidth available for data transfer between edge device 102 and hub device 104; and data storage capacity on hub device 104.

In an example, data policy engine 132 on edge device 102 may determine whether to provide repeatedly requested data for an analytical process (for example, P3) to hub device in advance of execution of the analytical process P3 on hub device 102 based on at least one of bandwidth available for data transfer between edge device 102 and hub device 104, and data storage capacity on hub device 104.

Data policy engine 134 on hub device 104 may determine similar parameters related to an analytical process (for example, P1) on edge device 102, as described above in relation to data policy engine 132. In an example, the parameter may include a re-execution count of an analytical process (for example, P5; not illustrated) on edge device 102. In response to a determination by data policy engine 134 that the re-execution count of an analytical process on edge device 102 is above a predefined threshold, data policy engine 134 on hub device 104 may provide input data for the analytical process to edge device 102 in advance of execution of the analytical process on edge device 102.

In an example, data policy engine 134 on hub device 104 may determine whether to provide new data for an analytical process to edge device 102 in advance of execution of the analytical process on edge device 102 based on at least one of: a ranking of new datasets in the new data; bandwidth available for data transfer between edge device 102 and hub device 104; and data storage capacity on edge device 102. In another example, data policy engine 134 on hub device 104 may determine whether to provide repeatedly requested data for an analytical process to edge device 102 in advance of execution of the analytical process on edge device 102 based on at least one of bandwidth available for data transfer between edge device 102 and hub device 104, and data storage capacity on edge device 102.

Figure 7:
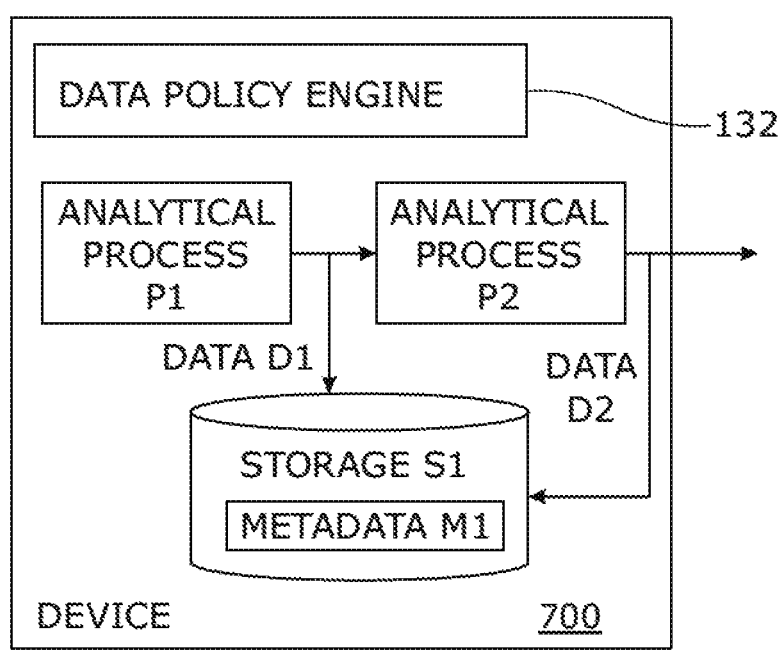
FIG. 7 is a block diagram of an example device to provision data for an analytical process based on lineage metadata.

FIG. 7 is a block diagram of an example device 700 to provision data for an analytical process based on lineage metadata. In an example, device 700 may be similar to device 102 of FIG. 1 or 2.

Device 700 may include a data policy engine 132, as described above in relation to FIG. 6.

In an example, data policy engine 132 may determine, based on lineage metadata M1 stored on the device 700, a value of a parameter related to failure to execute a given analytical process on a remote hub device (for example, 104). The analytical process may be a part of an analytical workflow that is implemented at least in part on the device 700 and the remote hub device. In response to a determination that the value of the parameter related to failure to execute the given analytical process on the remote hub device is above a predefined threshold, data policy engine 132 may provide to the remote hub device, input data for the analytical process in advance of execution of the analytical process on the remote hub device without a request for the input data by the remote hub device.

FIG. 8 is a flowchart of an example method 800 for provisioning data to an analytical process based on lineage metadata. The method 800, which is described below, may at least partially be executed on a device, for example, device 102 and 104 of FIGS. 1 and 2. However, other devices may be used as well. At block 802, a value of a parameter related to a number of historical attempts at execution of an analytical process on a remote hub device may be determined based on lineage metadata stored on an edge device. The analytical process may be part of an analytical workflow that may be implemented at least in part on the edge device and the remote hub device. At block 804, in response to a determination that the value of the parameter related to the number of historical attempts at execution of the analytical process on the remote hub device is above a predefined threshold, the edge device provides input data for a future execution of the analytical process to the remote hub device in advance of performance of the future execution of the analytical process on the remote hub device without a request for the input data by the remote hub device.

Figure 9:
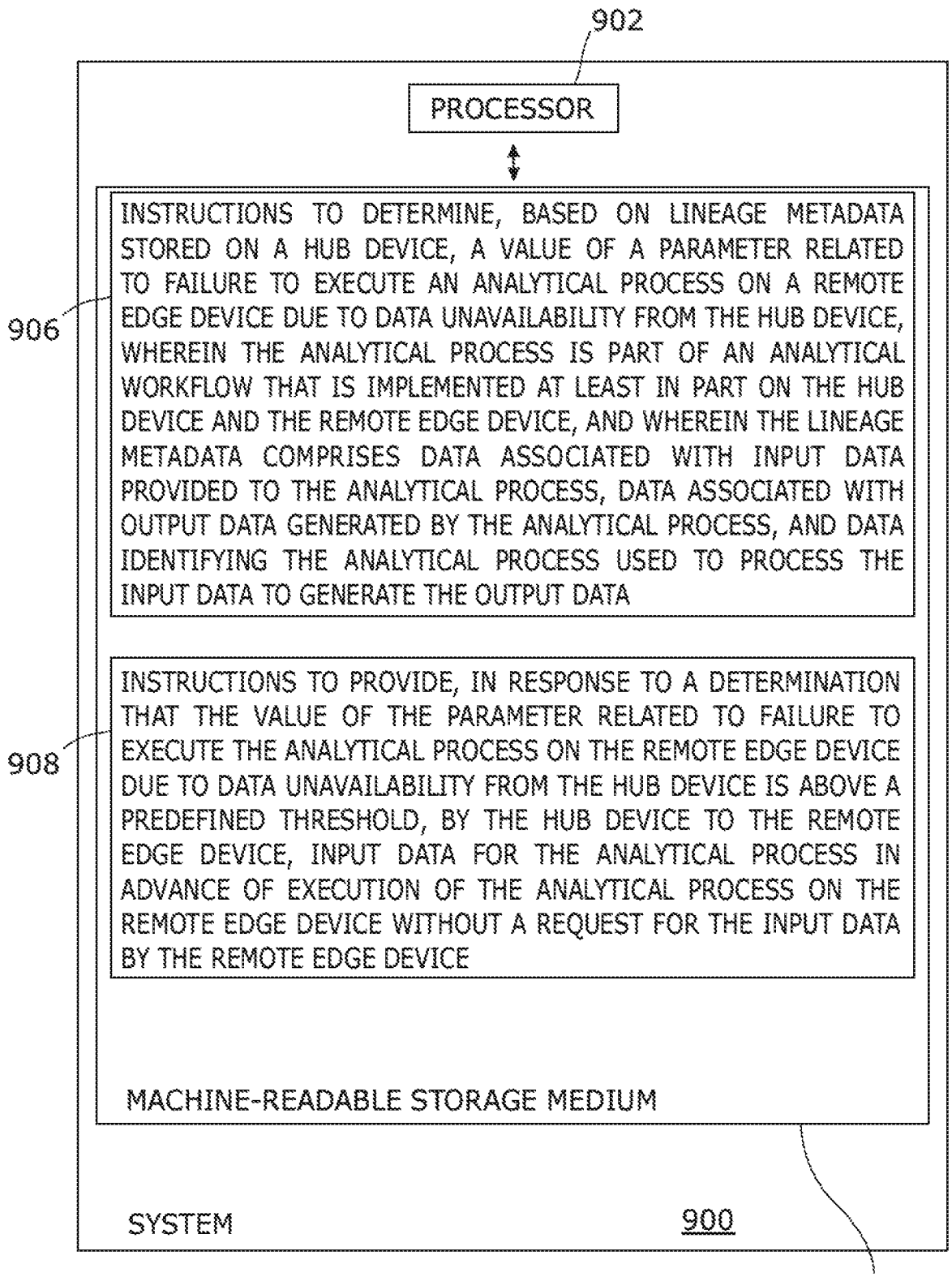
FIG. 9 is a block diagram of an example system including instructions in a machine-readable storage medium to provision data for an analytical process based on lineage metadata.

FIG. 9 is a block diagram of an example system 900 including instructions in a machine-readable storage medium to provision data for an analytical process based on lineage metadata. System 900 includes a processor 902 and a machine-readable storage medium 904 communicatively coupled through a system bus. In an example, system 900 may be implemented by any suitable device, as described herein in relation to devices 102 and 104 of FIG. 1 or 2. Processor 902 may be any type of Central Processing Unit (CPU), microprocessor, or processing logic that interprets and executes machine-readable instructions stored in machine-readable storage medium 904. Machine-readable storage medium 904 may be a random access memory (RAM) or another type of dynamic storage device that may store information and machine-readable instructions that may be executed by processor 902. For example, machine-readable storage medium 904 may be Synchronous DRAM (SDRAM), Double Data Rate (DDR), Rambus DRAM (RDRAM), Rambus RAM, etc. or a storage memory media such as a floppy disk, a hard disk, a CD-ROM, a DVD, a pen drive, and the like. In an example, machine-readable storage medium 904 may be a non-transitory machine-readable medium. Machine-readable storage medium 904 may store instructions 906 and 908. In an example, instructions 906 may be executed by processor 902 to determine, based on lineage metadata stored on a hub device, a value of a parameter related to failure to execute a given analytical process on a remote edge device due to data unavailability from the hub device, wherein the analytical process is part of an analytical workflow that is implemented at least in part on the hub device and the remote edge device. Instructions 908 may be executed by processor 902 to, in response to a determination that the value of the parameter related to failure to execute the analytical process on the remote edge device due to data unavailability from the hub device is above a predefined threshold, provide by the hub device to the remote edge device, input data for the analytical process in advance of execution of the analytical process on the remote edge device without a request for the input data by the remote edge device.

Figure 10:
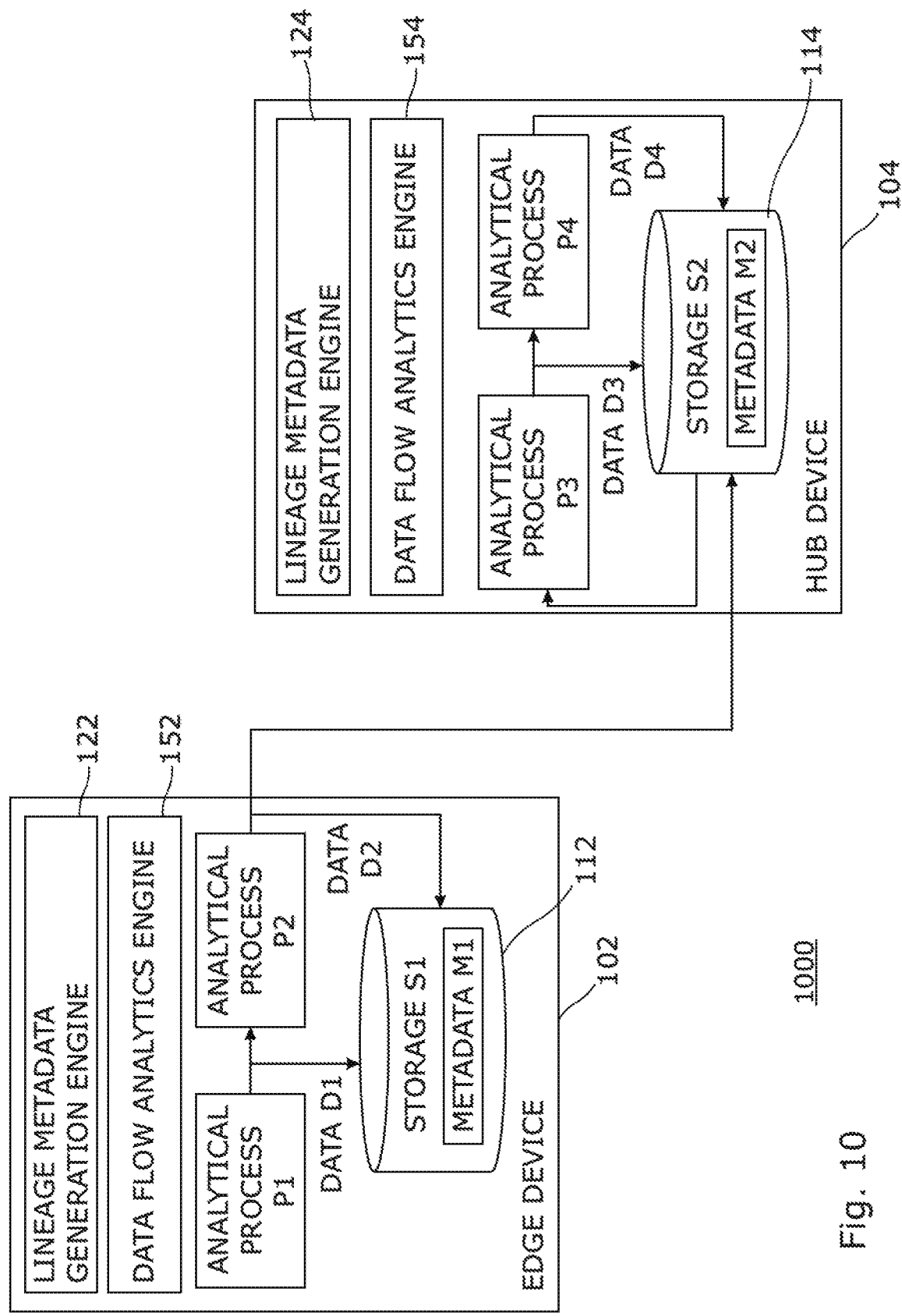
FIG. 10 is a block diagram of an example computing environment to relocate an analytical process based on lineage metadata.

FIG. 10 is a block diagram of an example computing environment 1000 to relocate an analytical process based on lineage metadata. In an example, edge device 102 and hub device 104 may each include a data flow analytics engine 152 and 154, respectively.

The data flow analytics engine 152 may determine whether an analytical process (for example, P1 and P2) associated with the edge device 102 may be relocated to another device (for example, hub device 104). The data flow analytics engine 152 may carry out the determination, for example, to determine whether the relocation of an analytical process may lead to any benefits related to the execution of an associated workflow. These benefits may include, for example, a reduction in execution time of an analytical process of the workflow and/or a reduction in execution time of the entire workflow.

In an example, the determination whether an analytical process (for example, P2) associated with the edge device 102 may be relocated to another device (for example, hub device 104) may comprise an analytical component and a response component. The analytical component may comprise analyzing a result of relocating the analytical process P2 from the edge device 102 to hub device 104. In an example, an analytical process P2 may be temporarily relocated from edge device 102 to hub device 104 and, in response to the relocation, a parameter related to edge device 102 and/or hub device 104 may be analyzed by the analytical component of the data flow analytics engine 152. Some examples of the parameter that may be analyzed may include: a data flow rate available between edge device 102 and hub device 104; a data flow rate available between a storage component and a processing component of edge device 102; a data flow rate available between a storage component and a processing component of hub device 104; processing resources available on edge device 102; processing resources available on hub device 104; and processor time used for the execution of the analytical process. The data flow analytics engine 152 may store the data generated consequent to the analysis as part of metadata M1 in repository S1 of edge device 102.

In an example, the analytical component of the data flow analytics engine 152 may determine a result of relocating the analytical process P2 from edge device 102 to hub device 104 as follows. The analytical component of data flow analytics engine 152 may determine, as a baseline, the typical execution time of the entire workflow on edge device 102 and hub device 104. In example, the execution time of the workflow may be calculated as a sum of sum of time taken for respective data flows during execution of analytical processes in the workflow and sum of respective processor time consumed by analytical processes in the workflow. The time taken for a data flow may be determined as data flow rate in or between edge device 102 and hub device 104*data amount.

In response to determining the baseline, the analytical component of the data flow analytics engine 152 may determine the impact of moving the analytical process P2 from edge device 102 to hub device 104 on execution time of the analytical process P2. In an example, the analytical component of the data flow analytics engine 152 may determine the impact of moving the analytical process P2 from edge device 102 to hub device 104 on execution time of the entire workflow. In an example, the determination may be made by subtracting the data flow and processing time of the analytical process P2 from the baseline, and adding one or more of the following: i) Inbound data amount*internal data rate in hub device 104, wherein inbound data amount may represent amount of incoming data into hub device 104, and internal data rate may represent data processing rate in hub device 104; ii) Outbound data amount*data rate between edge device 102 and hub device 104, wherein outbound data amount may represent amount of outgoing data from hub device 104, and data rate between edge device 102 and hub device 104 may represent rate of data flow between edge device 102 and hub device 104; and iii)<Processing time on edge device 102>/<relative processing rate of edge device 102>*<relative processing rate in hub device 104>, wherein processing time on edge device may represent processing time of the analytical process P2 on edge device 102; relative processing rate of edge device 102 may represent average processing rate of analytical processes on edge device 102; and relative processing rate in hub device 104 may represent processing time of the analytical process P2 on hub device 104. The data flow analytics engine 152 may store time data generated consequent to the analysis in repository S1 of edge device 102. The time data may include, for example, data related to execution time of the analytical process P2 and/or execution time of the entire analytical workflow.

In response to the analysis, the response component of the data flow analytics engine 152 may determine whether to relocate the analytical process P2 from edge device 102 to hub device 104. In an example, if the results of the analysis indicate at least one of a reduction in execution time of the analytical process P2 or a reduction in execution time of the entire workflow, data flow analytics engine 152 may relocate the analytical process P2 from edge device 102 to hub device 104. In an example, the data flow analytics engine 152 may use metadata M1 to determine whether the analytical process P2 may be relocated from edge device 102 to hub device 104. A similar determination process may be used for another analytical process (for example, P2) to determine relocation feasibility of the process. Likewise, data flow analytics engine 154 on hub device 104 may be used to determine whether an analytical process (for example, P3 and P4) associated with hub device 104 may be relocated to another device (for example, edge device 102). The data flow analytics engine 154 on hub device 104 may perform functionalities similar to those described for the data flow analytics engine 152.

In an example, the data flow analytics engine 152 may determine, during execution of an analytical process (for example, P1), a parameter related to the data exchanged between edge device 102 and hub device 104. In an example, the parameter may include a frequency of data exchange between edge device 102 and hub device 104. In another example, the parameter may include a recency data exchanged between edge device 102 and hub device 104. In response to the determination, the data flow analytics engine 152 may identify, from the exchanged data, data that is seldom used during execution of the analytical process P1. In response to the identification, the data flow analytics engine 152 may avoid exchange of the seldom used data between edge device 102 and hub device 104.

In an example, the data flow analytics engine 152 may add data generated in response to the determination of the parameter to lineage metadata M1 in storage repository S1. The data flow analytics engine 152 may use lineage metadata M1 to identify, for example, seldom used data during execution of the analytical process P1. In an example, metadata generation engine 122 may send a copy of metadata M1 to hub device 104. In response, hub device 104 may store lineage metadata in a storage repository S2. Thus, both edge devices 102 and hub device 104 may store lineage metadata M1.

Likewise, the data flow analytics engine 154 in hub device 104 may be used to determine, during execution of an analytical process (for example, P3 or P4), a parameter related to data exchanged between edge device 102 and hub device 104. The data flow analytics engine 154 in hub device 104 may then perform functionalities similar to those described for the data flow analytics engine 152.

Figure 11:
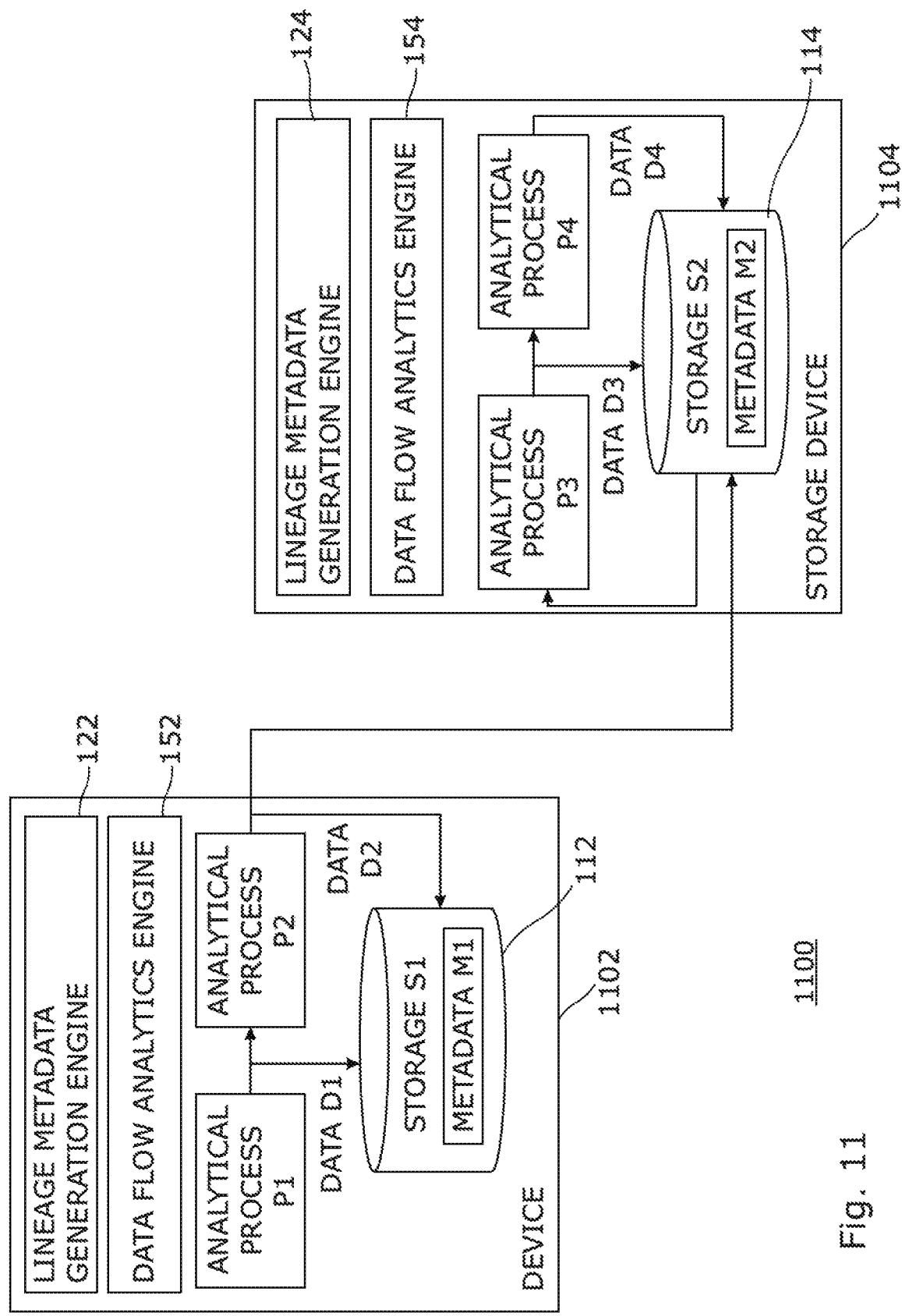
FIG. 11 is a block diagram of an example computing environment to relocate an analytical process based on lineage metadata.

FIG. 11 is a block diagram of an example computing environment 1100 to relocate an analytical process based on lineage metadata. In an example, device 1102 and storage device 1104 may each include a data flow analytics engine 152 and 154, respectively.

In an example, device 1102 may be an edge device, which may be similar to edge device 102 of FIG. 1. In another example, device 1102 may be a hub device, which may be similar to hub device 104 of FIG. 1. Although one device 1102 is shown in FIG. 11, other examples of this disclosure may include more than one device and more than one storage device. In an example, at least one of the devices may be an edge device, and at least one of the devices may be a hub device. In an example, an edge device, a hub device, and a storage device may implement one or more of analytical processes of an analytical workflow.

In an example, storage device 1104 may be an internal storage device, an external storage device, or a network attached storage device. Some examples of storage device 1104 may include a hard disk drive, a storage disc (for example, a CD-ROM, a DVD, etc.), a storage tape, a solid state drive (SSD), a USB drive, a Serial Advanced Technology Attachment (SATA) disk drive, a Fibre Channel (FC) disk drive, a Serial Attached SCSI (SAS) disk drive, a magnetic tape drive, an optical jukebox, and the like. In an example, storage device 1104 may be a Direct Attached Storage (DAS) device, a Network Attached Storage (NAS) device, a Redundant Array of Inexpensive Disks (RAID), a data archival storage system, or a block-based device over a storage area network (SAN). In another example, storage device 1104 may be a storage array, which may include a storage drive or plurality of storage drives (for example, hard disk drives, solid state drives, etc.). In an example, storage device 1104 may be a distributed storage node, which may be part of a distributed storage system that may include a plurality of storage nodes. In another example, storage device 1104 may be a disk array or a small to medium sized server re-purposed as a storage system with similar functionality to a disk array having additional processing capacity.

Data flow analytics engines 152 and 154 on device 1102 and storage device 1104 respectively may each perform functionalities as described herein in relation to FIG. 10. In an example, data flow analytics engine may determine whether an analytical process (for example, P1 and P2) associated with device 102 may be relocated to another device (for example, storage device 1104). The data flow analytics engine 152 may carry out the determination, for example, to determine whether the relocation of an analytical process may lead to any benefits related to the execution of an associated workflow. These benefits may include, for example, a reduction in execution time of an analytical process of the workflow and/or a reduction in execution time of the entire workflow.

Figure 12:
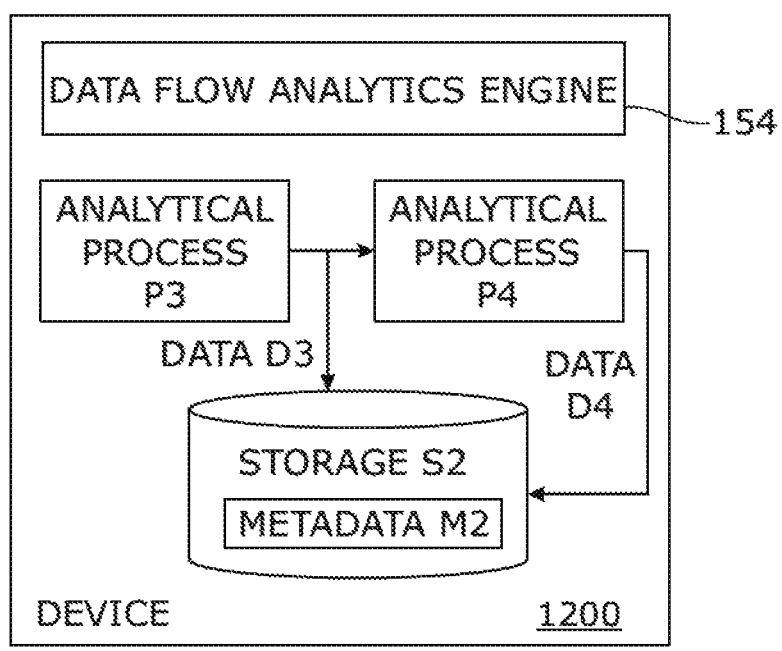
FIG. 12 is a block diagram of an example device to relocate an analytical process based on lineage metadata.

FIG. 12 is a block diagram of an example device 1200 to relocate data for an analytical process based on lineage metadata. In an example, device 1200 may be implemented by any suitable device, as described herein in relation to device 104 of FIG. 1 or 2.

Device 1200 may include a data flow analytics engine 154, as described above in relation to FIG. 10.

In an example, data flow analytics engine 154 may determine, based on lineage metadata on the device 1200, whether relocating an analytical process from the device to a remote storage device reduces execution time of the analytical process. The analytical process may be part of an analytical workflow that is implemented at least in part on the device. The lineage metadata may comprise at least one of data associated with input data provided to an analytical process, data associated with output data generated by the analytical process, data identifying the analytical process used to process the input data to generate the output data, and data related to the analytical workflow. In response to a determination that relocation of the analytical process from the device to the remote storage device reduces the execution time of the analytical process, data flow analytics engine may relocate the analytical process from the device to the remote storage device.

Figure 13:
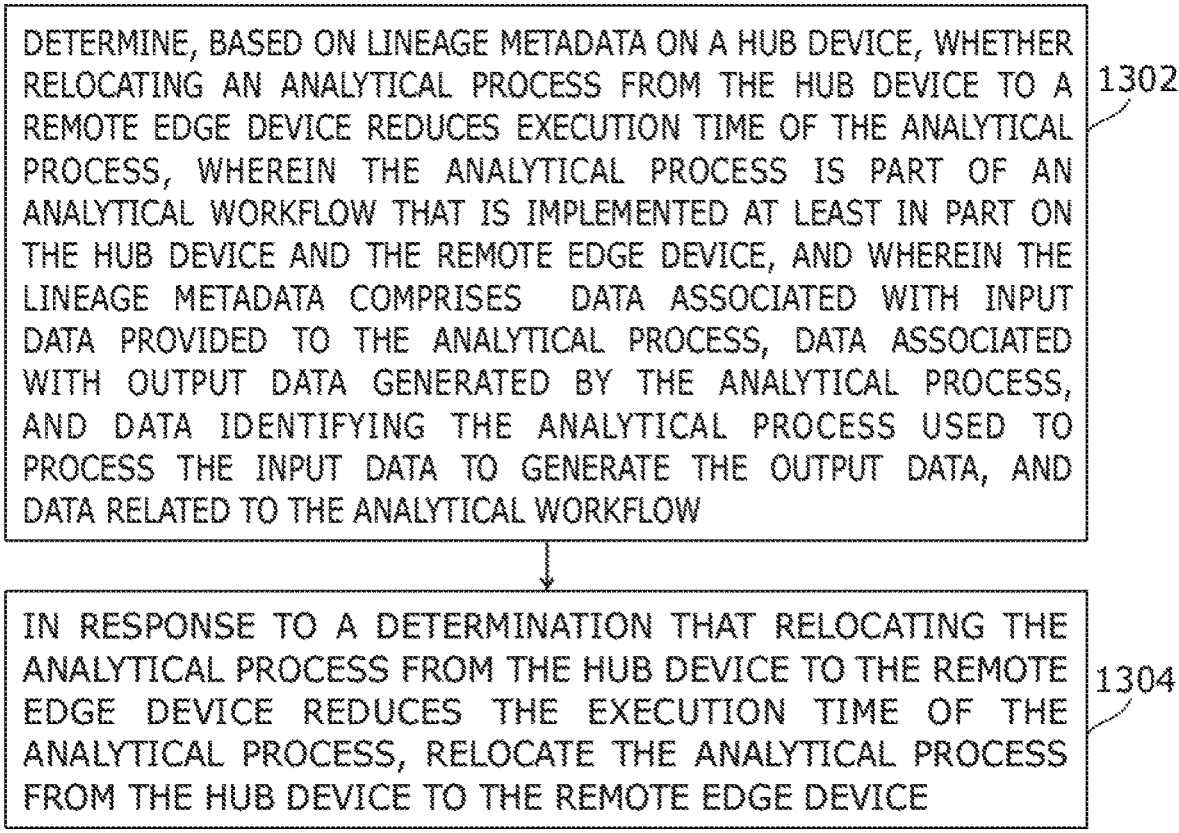
FIG. 13 is a flowchart of an example method for relocate an analytical process based on lineage metadata.

FIG. 13 is a flowchart of an example method 1300 for relocating an analytical process based on lineage metadata. The method 1300, which is described below, may at least partially be executed on a suitable device as described above in relation to devices 102 and 104 of FIGS. 1 and 2, for example. However, other devices may be used as well. At block 1302, a determination may be made based on lineage metadata on a hub device whether relocating an analytical process from the hub device to a remote edge device reduces execution time of the analytical process. The analytical process may be part of an analytical workflow that is implemented at least in part on the hub device and the remote edge device. The lineage metadata may comprise at least one of data associated with input data provided to an analytical process, data associated with output data generated by the analytical process, data identifying the analytical process used to process the input data to generate the output data, and data related to the analytical workflow. At block 1304, in response to a determination that relocating the analytical process from the hub device to the remote edge device reduces the execution time of the analytical process, the analytical process may be relocated from the hub device to the remote edge device.

Figure 14:
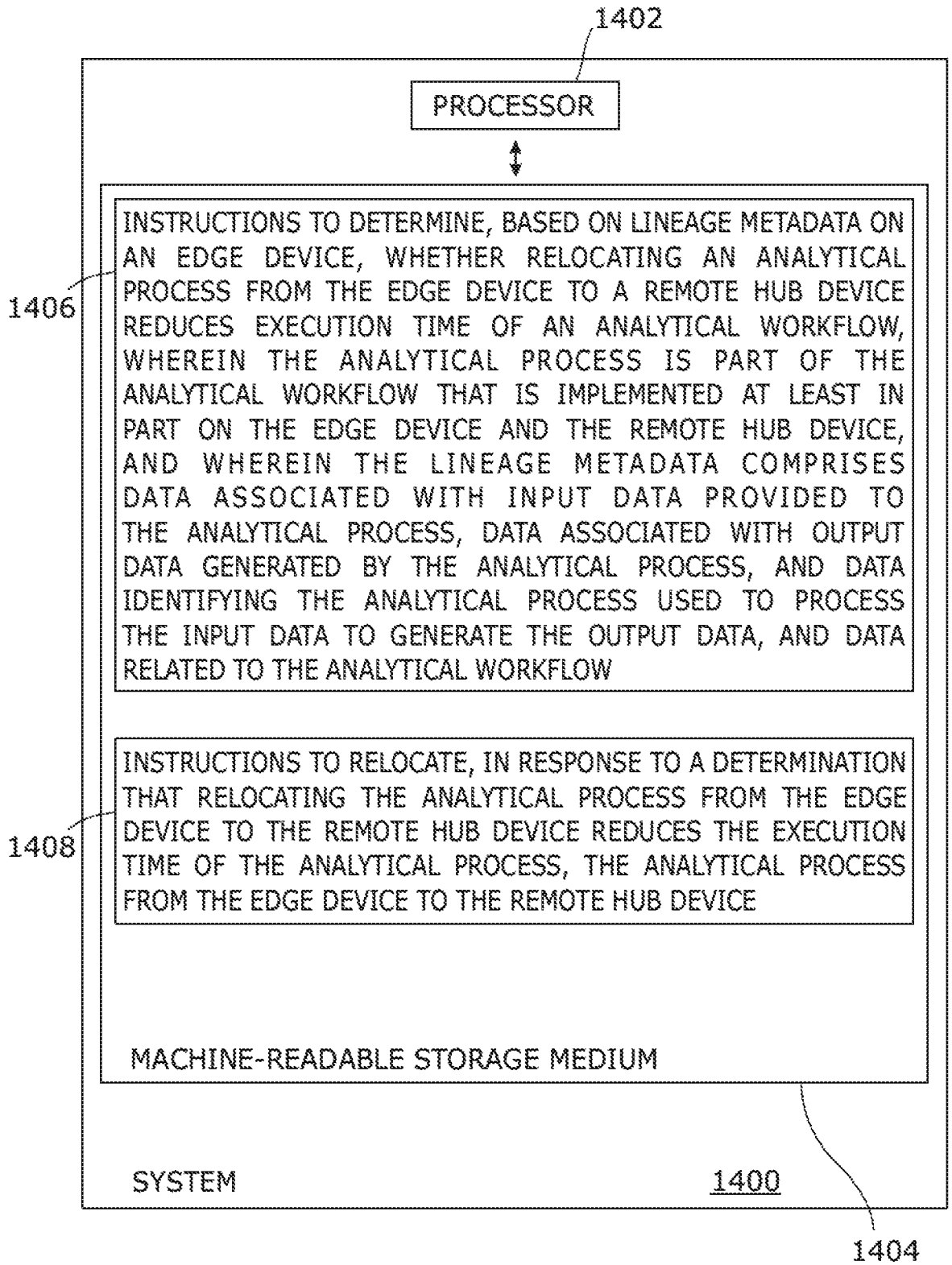
FIG. 14 is a block diagram of an example system including instructions in a machine-readable storage medium to relocate an analytical process based on lineage metadata.

FIG. 14 is a block diagram of an example system 1400 including instructions in a machine-readable storage medium to relocate an analytical process based on lineage metadata. System 1400 includes a processor 1402 and a machine-readable storage medium 1404 communicatively coupled through a system bus. In an example, system 1400 may be analogous to device 102 or 104 of FIG. 1 or 2. Processor 1402 may be any type of Central Processing Unit (CPU), microprocessor, or processing logic that interprets and executes machine-readable instructions stored in machine-readable storage medium 1404. Machine-readable storage medium 1404 may be a random access memory (RAM) or another type of dynamic storage device that may store information and machine-readable instructions that may be executed by processor 1402. For example, machine-readable storage medium 1404 may be Synchronous DRAM (SDRAM), Double Data Rate (DDR), Rambus DRAM (RDRAM), Rambus RAM, etc. or a storage memory media such as a floppy disk, a hard disk, a CD-ROM, a DVD, a pen drive, and the like. In an example, machine-readable storage medium 1404 may be a non-transitory machine-readable medium. Machine-readable storage medium 1404 may store instructions 1406 and 1408. In an example, instructions 1406 may be executed by processor 1402 to determine, based on lineage metadata on an edge device, whether relocating an analytical process from the edge device to a remote hub device reduces execution time of an analytical workflow, wherein the analytical process is part of the analytical workflow that is implemented at least in part on the edge device and the remote hub device, and wherein the lineage metadata may comprise at least one of data associated with input data provided to an analytical process, data associated with output data generated by the analytical process, data identifying the analytical process used to process the input data to generate the output data, and data related to the analytical workflow. Instructions 1408 may be executed by processor 1402 to, in response to a determination that relocating the analytical workflow from the edge device to the remote hub device reduces the execution time of the analytical process, relocating the analytical process from the edge device to the remote hub device.

For the purpose of simplicity of explanation, the example method of FIGS. 4, 8, and 12 is shown as executing serially, however it is to be understood and appreciated that the present and other examples are not limited by the illustrated order. The example systems of FIGS. 1, 2, 3, 5, 6, 7, 9, 10, 11, 12, and 14, and method of FIGS. 4, 8, and 13 may be implemented in the form of a computer program product including computer-executable instructions, such as program code, which may be run on any suitable computing device in conjunction with a suitable operating system (for example, Microsoft Windows, Linux, UNIX, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration. Although the solution has been described in conjunction with a specific example thereof, numerous modifications may be possible without materially departing from the teachings of the subject matter described herein. Other substitutions, modifications and changes may be made without departing from the spirit of the present solution. All of the features disclosed in this specification (including any accompanying claims, abstract and drawings), and/or all of the stages of any method or process so disclosed, may be combined in any combination, except combinations where at least some of such features and/or stages are mutually exclusive.

The invention claimed is:

1. A method comprising:
   determining, on a hub device, that an analytical process previously executed on a remote edge device is to be re-executed on the hub device, wherein the analytical process is part of an analytical workflow that is implemented on the hub device and the remote edge device;
   in response to the determination, identifying, based on lineage metadata stored on the hub device, a storage location of input data for re-executing the analytical process, wherein the lineage metadata comprises data associated with input data provided to the analytical process, data associated with output data generated by the analytical process, and data identifying the analytical process used to process the input data to generate the output data; and
   acquiring, on the hub device, the input data from the storage location;
   wherein determining that the analytical process is to be re-executed comprises determining a number of times the analytical process failed to be executed on the hub device, and a number of times a request for the input data is unfulfilled by the remote edge device, due to unavailability of the input data from the remote edge device.

2. The method of claim 1, further comprising re-executing the analytical process on the hub device based on the input data.

3. The method of claim 1, wherein the storage location of the input data includes the remote edge device.

4. The method of claim 1, wherein the storage location of the input data includes at least one additional edge device.

5. The method of claim 1, wherein the analytical process is to be re-executed on the hub device due to a change in a parameter considered during execution of the analytical process on the remote edge device.

6. A device comprising:
   one or more hardware processors; and
   a determination engine, executing on the one or more hardware processors, to determine that an analytical process previously executed on a remote edge device is to be re-executed on the device, wherein the analytical process is part of an analytical workflow that is implemented on the device and the remote edge device;
   an identification engine, executing on the one or more hardware processors, to, in response to the determination, identify based on lineage metadata stored on the device, a storage location of input data to re-execute the analytical process, wherein the lineage metadata comprises data associated with input data provided to the analytical process, data associated with output data generated by the analytical process, and data identifying the analytical process used to process the input data to generate the output data; and
   an acquisition engine, executing on the one or more hardware processors, to acquire the input data from the storage location;
   wherein determine that the analytical process is to be re-executed comprises determine a number of times the analytical process failed to be executed on the hub device, and a number of times a request for the input data is unfulfilled by the remote edge device, due to unavailability of the input data from the remote edge device.

7. The device of claim 6, wherein the lineage metadata is acquired from the remote edge device.

8. The device of claim 6, wherein the lineage metadata further includes lineage metadata of the analytical workflow, wherein the lineage metadata of the analytical workflow includes data related to:
   input data for each analytical process in the analytical workflow;
   each analytical process in the analytical workflow; and
   output data of each analytical process in the analytical workflow.

9. The device of claim 6, wherein the lineage metadata of the analytical workflow is generated on the device.

10. The device of claim 6, wherein the acquisition engine to re-execute the analytical process based on the input data.

11. A non-transitory machine-readable storage medium comprising instructions, the instructions executable by a processor to:
   determine, on a hub device, that an analytical process previously executed on a remote edge device is to be re-executed on the hub device, wherein the analytical process is part of an analytical workflow that is implemented on the hub device and the remote edge device;
   in response to the determination, identify, based on lineage metadata stored on the hub device, a storage location of input data to re-execute the analytical process, wherein the lineage metadata comprises data associated with input data provided to the analytical process, data associated with output data generated by the analytical process, and data identifying the analytical process used to process the input data to generate the output data;

acquire, on the hub device, the input data from the storage location; and re-execute, on the hub device, the analytical process based on the input data;

wherein determine that the analytical process is to be re-executed comprises determine a number of times the analytical process failed to be executed on the hub device, and a number of times a request for the input data is unfulfilled by the remote edge device, due to unavailability of the input data from the remote edge device.

12. The storage medium of claim 11, wherein the instructions to identify include instructions to identify, from the lineage metadata, the input data to re-execute the analytical process on the hub device.

13. The storage medium of claim 11, wherein the hub device and the remote edge device are part of an Internet of Things (IoT) network.

14. The storage medium of claim 13, wherein the storage location of the input data includes a storage device in the IoT network.

15. The storage medium of claim 11, further comprising instructions to generate the lineage metadata.

\* \* \* \* \*